US010028124B2

United States Patent
Qi et al.

(10) Patent No.: US 10,028,124 B2
(45) Date of Patent: Jul. 17, 2018

(54) APPARATUS, SYSTEM AND METHOD OF AWARENESS NETWORKING COMMUNICATIONS OVER A SUB 1 GIGAHERTZ BAND

(71) Applicant: INTEL IP CORPORATION, Santa Clara, CA (US)

(72) Inventors: Emily H. Qi, Camas, WA (US); Po-Kai Huang, Portland, OR (US); Minyoung Park, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 423 days.

(21) Appl. No.: 14/670,599

(22) Filed: Mar. 27, 2015

(65) Prior Publication Data

US 2016/0198328 A1 Jul. 7, 2016

Related U.S. Application Data

(60) Provisional application No. 62/099,168, filed on Jan. 1, 2015.

(51) Int. Cl.
*H04W 8/00* (2009.01)
*H04L 5/00* (2006.01)
*H04L 27/00* (2006.01)

(52) U.S. Cl.
CPC .......... *H04W 8/005* (2013.01); *H04L 5/0048* (2013.01); *H04L 27/0006* (2013.01)

(58) Field of Classification Search
None
See application file for complete search history.

(56) References Cited

U.S. PATENT DOCUMENTS

| 2012/0294294 A1* | 11/2012 | Zhang | H04L 1/0025 370/338 |
| 2015/0098388 A1* | 4/2015 | Fang | H04W 48/16 370/328 |
| 2016/0165653 A1* | 6/2016 | Liu | H04W 76/023 370/329 |

OTHER PUBLICATIONS

IEEE Std 802.11™-2612. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Anez Ebrahim
(74) *Attorney, Agent, or Firm* — Shichrur & Co.

(57) ABSTRACT

Some demonstrative embodiments include apparatuses, systems and/or methods of awareness networking communications over a Sub 1 Gigahertz Band. For example, an apparatus may include logic and circuitry configured to cause a wireless station to determine a timing of a plurality of Discovery Windows (DWs) according to a Neighbor Awareness Networking (NAN) Protocol; and communicate one or more NAN messages over a Sub 1 Gigahertz (GHz) (S1G) band during one or more of the DWs.

25 Claims, 5 Drawing Sheets

(56) References Cited

OTHER PUBLICATIONS

Wi-Fi Alliance, Wi-Fi Peer-to-Peer (P2P) Technical Specification Version 1.5, Aug. 4, 2014, 183 pages.
IEEE P802.11ah™/D3.1; Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Sub 1 GHz License Exempt Operation, Nov. 2014, 611 pages.

* cited by examiner

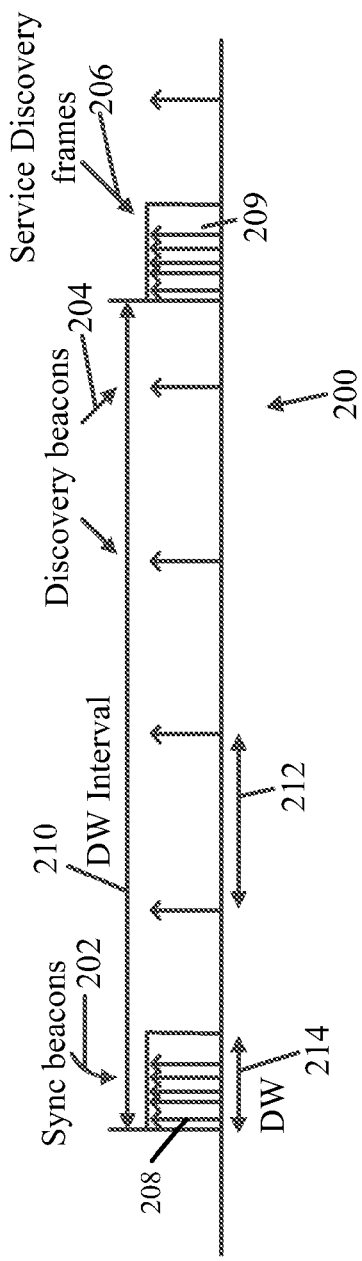
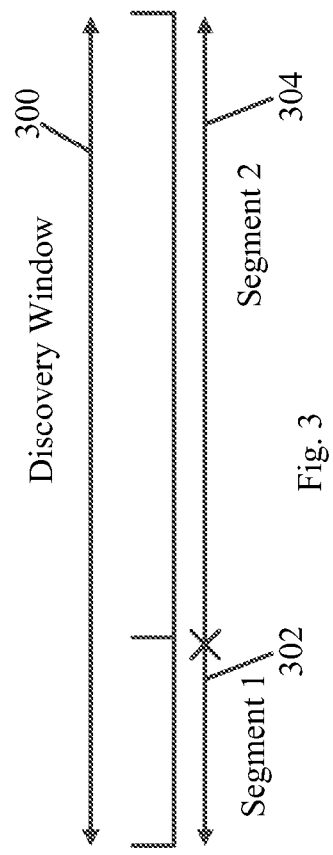
Fig. 2
Fig. 3

APPARATUS, SYSTEM AND METHOD OF AWARENESS NETWORKING COMMUNICATIONS OVER A SUB 1 GIGAHERTZ BAND

CROSS REFERENCE

This application claims the benefit of and priority from U.S. Provisional Patent Application No. 62/099,168 entitled "Apparatus, System and Method of Awareness Networking Communications Over a Sub 1 Gigahertz Band", filed Jan. 1, 2015, the entire disclosure of which is incorporated herein by reference.

TECHNICAL FIELD

Embodiments described herein generally relate to awareness networking communications.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be preformed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic illustration of a discovery scheme, in accordance with some demonstrative embodiments.

FIG. 3 is a schematic illustration of a discovery window, in accordance with some demonstrative embodiments.

DETAILED DESCRIPTION

Figure 1:
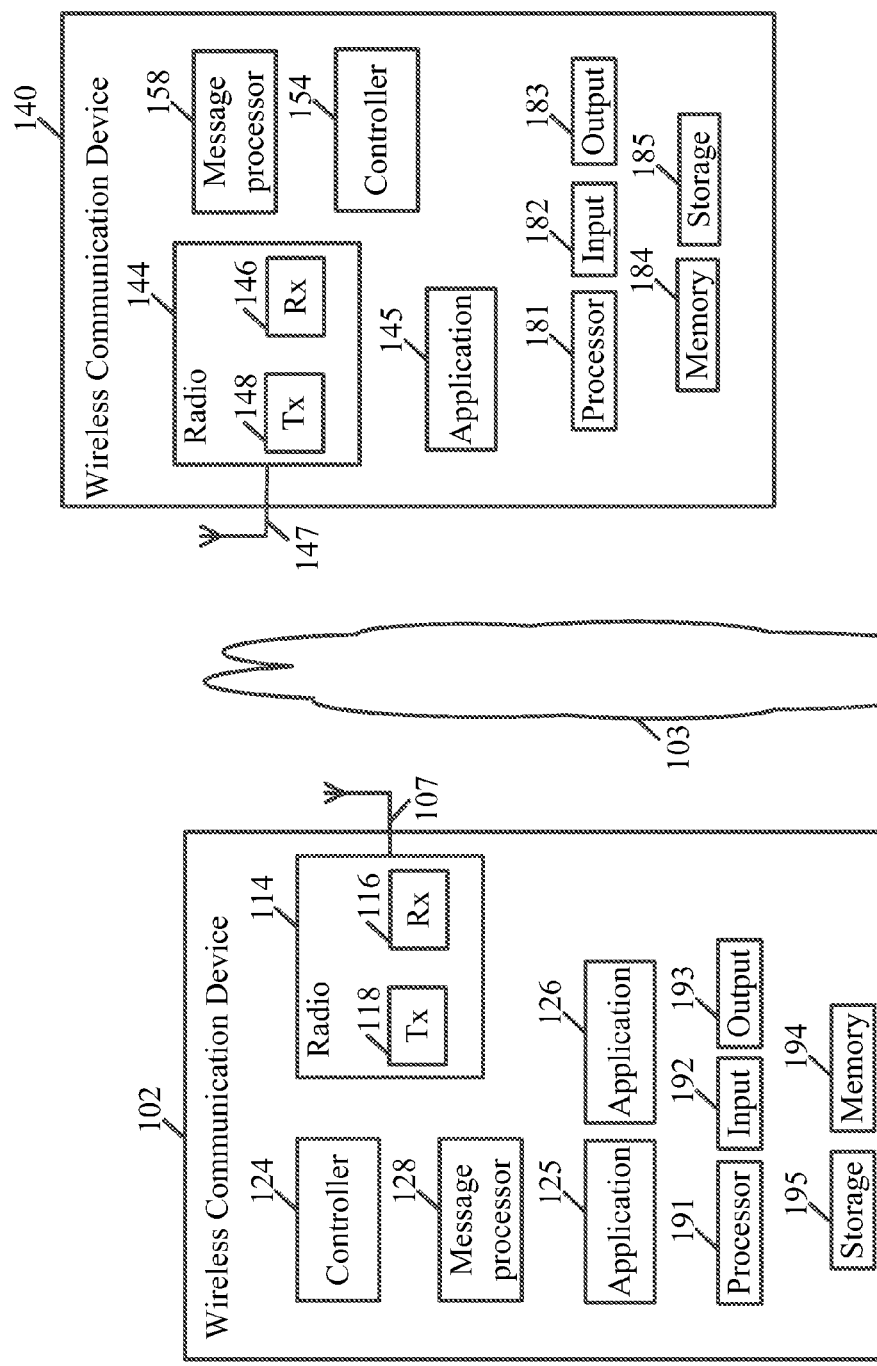
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (WiFi P2P technical specification, version 1.2, 2012) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification'); and/or IEEE 802.11ah (IEEE P802.11ah™/D1.2; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation", February 2014)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a User Equipment (UE), a Mobile Device (MD), a Station (STA), a Sub 1 Gigahertz (S1G) STA, a sensor type STA, an Access Point (AP), an AP STA, a non-AP STA, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, a Sub 1 GHz (S1G) station (STA) may include a station configured to communicate over one or more frequency bands below 1 GHz. In one example, a S1G STA may be configured, for example, to communicate over one or more bands below 1 GHz, for example, excluding the TV White Space bands, e.g., with a transmission range up to 1 Kilometer (km) and a minimum data rate of at least 100 Kilobyte per second (Kb/s), or any other range and/or data rate. The S1G STA may perform any other additional or alternative functionality.

In one example, a sensor type station (STA) may include, for example, a STA characterized as small data size, low traffic, limited available power, and large number of STAs per AP. The sensor type STA may perform any other additional or alternative functionality.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a sub 1 Gigahertz (GHz) (S1G) frequency band.

In some demonstrative embodiments, devices 102 and/or 140 may be configured to communicate over the S1G band. For example, devices 102 and/or 140 may be configured to perform the functionality of a S1G STA, e.g., as described below.

Additionally or alternatively, wireless communication medium 103 may include a wireless communication channel over a 2.4 GHz frequency band, a 5 GHz frequency band, a millimeterWave (mmWave) frequency band, e.g., a 60 GHz frequency band, and/or any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over the S1G band, a 2.4 GHz band, a 5 GHz band, a mmWave band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may be part of, or may form, and/or communicate as part of a wireless local area network (WLAN).

In some demonstrative embodiments, wireless communication devices 102 and/or 140 may be part of, or may form, and/or communicate as part of a WiFi network.

In some demonstrative embodiments, wireless communication devices 102 and/or 140 may be part of, or may form, and/or communicate as part of a WiFi Direct (WFD) network, e.g., a WiFi direct services (WFDS) network, and/or may perform the functionality of one or more WFD devices.

In one example, device 102 and device 140 may include, or may perform the functionality of a WiFi Direct device.

In some demonstrative embodiments, wireless communication devices 102 and/or 140 may be capable of performing awareness networking communications, for example, according to an awareness protocol, e.g., a WiFi aware protocol, and/or any other protocol, e.g., as described below.

In some demonstrative embodiments, wireless communication devices 102 and/or 140 may be capable of performing awareness networking communications over the S1G band, e.g., as described below.

In some demonstrative embodiments, wireless communication devices 102 and/or 140 may be capable of forming a Neighbor Awareness Networking (NAN) network, e.g., a WiFI NAN, and/or may perform the functionality of one or more NAN devices.

In some demonstrative embodiments, wireless communication medium 103 may include a direct link, for example, a PTP link, e.g., a WiFI direct P2P link, for example, to enable direct communication between device 102 and device 140.

In some demonstrative embodiments, wireless communication devices 102 and/or 140 may perform the functionality of WFD P2P devices. For example, devices 102 and/or 140 may be able to perform the functionality of a P2P client device, and/or P2P group Owner (GO) device.

In other embodiments, wireless communication devices 102 and/or 140 may form and/or communicate as part of any other network, and/or perform the functionality of any other wireless devices or stations.

In some demonstrative embodiments, devices 102 and/or 140 may include one or more applications configured to provide, share, and/or to use one or more services, e.g., a social application, a file sharing application, a media application and/or the like, for example, using an awareness network, NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102 and/or 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 140 may include a controller configured to control one or more functionalities of devices 102 and/or 140, for example, one or more functionalities of communication, e.g., communication over the S1G, awareness networking communications, NAN communication and/or any other communication, between devices 102 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In one example, controller 124 may include one or more processors including circuitry and/or logic to cause a wireless device, e.g., device 102, and/or a wireless station, e.g., a wireless STA implemented by device 102, to perform one or more operations, communications and/or functionalities, e.g., as described herein.

In one example, controller 154 may include one or more processors including circuitry and/or logic to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may perform the functionality of a device or station, for example, a S1G STA, a NAN device, a WFD device, a WLAN device, or any other device capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a NAN discovery scheme, or any other awareness networking and/or discovery scheme, e.g., as described below.

In some demonstrative embodiments, devices 102 and/or 140 may be configured to perform awareness networking communications over the S1G band, e.g., as described below.

In some demonstrative embodiments, devices 102 and/or 140 may be configured to perform the awareness networking communications over the S1G band according to an awareness networking scheme, e.g., as described below.

In some demonstrative embodiments, the awareness networking scheme may include a discovery scheme or protocol, e.g., as described below.

In some demonstrative embodiments, devices 102 and/or 140 may perform a discovery process according to the discovery scheme, for example, to discover each other and/or to establish a wireless communication link, e.g., directional and/or high throughput wireless communication link.

In some demonstrative embodiments, devices 102 and/or 140 may be configured to enable time synchronization between device 102, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other awareness networking and/or discovery scheme, and/or any other awareness networking and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102 and/or 140, so that STAs can find each other more efficiently during a DW.

In some demonstrative embodiments, one of devices 102 and 140, e.g., device 102, may perform the functionality of a NAN master device, a master device, an anchor device, an anchor master device, or a manger device, which may be configured to transmit one or more beacons, e.g., as described below.

In some demonstrative embodiments, another one of devices 102 and 140, e.g., device 140, may perform the functionality of a NAN device, which may be configured to receive and process the beacons, e.g., as described below.

In some demonstrative embodiments, the NAN master device may be configured to transmit a Synchronization (Sync) beacon, e.g., within a DW, and/or a Discovery beacon, e.g., between consecutive DWs, e.g., as described below.

In some demonstrative embodiments, the Sync beacons and/or Discovery beacons may include information for performing one or more NAN operations, for example, timestamp information, which may be used for time synchronization among the NAN devices.

In some demonstrative embodiments, devices 102 and/or 140 may perform the functionality of NAN devices, e.g., belonging to a NAN cluster, which may share a common set of NAN parameters, for example, including a common NAN timestamp, and/or a common time period between consecutive discovery windows, e.g., as described above.

In some demonstrative embodiments, the NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, device 102 may be configured to transmit beacons, for example, sync beacons and/or discovery beacons, within a NAN cluster including devices 102 and 140, for example, according to a discovery scheme, e.g., as described below with reference to FIG. 2.

Reference is made to FIG. 2, which schematically illustrates a discovery scheme 200, in accordance with some demonstrative embodiments. For example, devices 102 and/ or 140 (FIG. 1) may communicate over WM 103 (FIG. 1) according to discovery scheme 200.

In one example, devices 102 and/or 140 (FIG. 1) may perform awareness networking communications according to discovery scheme 200.

As shown in FIG. 2, discovery scheme 200 may include a plurality of DWs, e.g., including two consecutive DWs 208 and 209.

As shown in FIG. 2, one or more discovery frames 206 may be communicated during a DW. For example, devices 102 and/or 140 (FIG. 1) may communicate one or more service discovery frames (SDF) 206 during DWs 208 and 209.

As shown in FIG. 2, a DW of the plurality of the DW may have a duration ("the DW duration") 214.

As shown in FIG. 2, in some demonstrative embodiments two consecutive DWs of discovery scheme 200, e.g., the two consecutive DWs 208 and 209, may be separated by a time period ("the DW interval") 210.

As shown in FIG. 2, in some demonstrative embodiments one or more Synchronization (Sync) beacons 202 may be communicated within a DW, e.g., within DWs 208 and/or 209.

As shown in FIG. 2, in some demonstrative embodiments one or more Discovery beacons 204 may be communicated between consecutive DWs, e.g., during the DW interval 210.

As shown in FIG. 2, in some demonstrative embodiments communication of two consecutive Discovery beacons 204 may be separated by a time period 212 ("Discovery beacon interval").

In some demonstrative embodiments, a NAN technology, e.g., a WiFI NAN technology, may be configured to enable low power device/service discovery based on Wi-Fi, e.g., in the 2.4 GHZ and/or 5 GHz frequency bands ("the 2.4/5 GHZ bands").

Referring back to FIG. 1, in some demonstrative embodiments, devices 102 and/or 140 may be configured to perform awareness networking over the S1G band according to discovery scheme 200 (FIG. 2), e.g., as described below.

In some demonstrative embodiments, communication over the S1G band may include, for example, communications operating at low frequencies, for example, 1 Megahertz (MHz) and 2 MHz, and optionally at 4 MHz, 8 MHz, and 16 MHz, and/or any other frequency channel, range or band.

In some demonstrative embodiments, communication over the S1G band may include, for example, communications at a low data rate, for example, a data rate as low as 300 kilobytes per second (kbps), or any other data rate.

In some demonstrative embodiments, communication over the S1G band may include, for example, using a data unit, for example, a Physical Layer Convergence Protocol (PLCP) Protocol Data Unit (PPDU), which may be longer, for example, than a data unit, e.g., a PPDU configured to be communicated over a higher band, for example, the 2.4/5 GHz bands. Accordingly, a PPDU, which may be used to carry one or more beacons, for example, NAN Beacon frames and/or Service Discovery Frames, over the S1G band may be, for example, longer than a PPDU used to carry beacons over the 2.4/5 GHZ bands.

In some demonstrative embodiments, devices 102 and/or 140 may be configured to perform awareness networking communications over the S1G band, e.g., as described below.

In some demonstrative embodiments, devices 102 and/or 140 may be configured to use a discovery scheme, e.g., discovery scheme 200 (FIG. 2), for communication over the S1G band.

In some demonstrative embodiments, devices 102 and/or 140 may be configured to use the discovery scheme according to one or more parameters.

In some demonstrative embodiments, the one or more parameters may include a DW interval, which defines a time between two consecutive DWs, e.g., DW interval 210 (FIG. 2).

In some demonstrative embodiments, the one or more parameters may include a DW duration, which defines a duration of a DW, e.g., DW duration 214 (FIG. 2).

In some demonstrative embodiments, the one or more parameters may include a discovery beacon interval, which defines a time between two consecutive discovery beacons, e.g., discovery beacon interval 212 (FIG. 2).

In some demonstrative embodiments, values of one or more parameters of discovery scheme 200 (FIG. 2) configured for communication over the 2.4/5 GHZ bands may not enable and/or may not be efficient for communication over the S1G band.

In some demonstrative embodiments, a discovery scheme, e.g., discovery scheme 200 (FIG. 2), for communication over the S1G band ("the S1G discovery scheme") may use values of one or more parameters, which may enable and/or may be suitable for communication over the S1G band.

In one example, a value of the DW duration configured for communication over the 2.4/5 GHZ bands may not enable and/or may not be efficient for communication over the S1G band. For example, a DW duration of 16 Time Units (TUs) may not be suitable and/or sufficient for communication over the S1G band. For example, a TU may include a time period of 1024 microseconds (usec) or any other time period.

In another example, a value of the DW interval configured for communication over the 2.4/5 GHZ bands may not enable and/or may not be efficient for communication over the S1G band. For example, a DW interval of 512 TUs may not be suitable and/or sufficient for communication over the S1G band.

In another example, a value of the discovery beacon interval configured for communication over the 2.4/5 GHZ bands may not enable and/or may not be efficient for communication over the S1G band. For example, a discovery beacon interval of 100 TUs may not be suitable and/or sufficient for communication over the S1G band.

In some demonstrative embodiments, the values of the one or more parameters of discovery scheme 200 (FIG. 2), which may be configured to perform communication over the S1G band, may be different from one or more corresponding values, which may be suitable for performing communication over the 2.4/5 GHz bands, e.g., as described below.

In some demonstrative embodiments, devices 102 and/or 140 may be configured to use one or more mechanisms, which may be configured, for example, to enable implementation of NAN technology over the S1G band, e.g., in accordance with an IEEE 802.11 ah Specification, for example, while extending range, and/or coverage, and/or reducing power consumption, e.g., as described below.

In some demonstrative embodiments, devices 102 and/or 140 may be configured to perform awareness networking communications, for example, utilizing a NAN technology, e.g., WiFI NAN or any other awareness networking technology, over the S1G band, e.g., in accordance with an IEEE 802.11ah Specification, and/or any other Protocol or Specification.

In some demonstrative embodiments, devices 102 and/or 140 may utilize a channelization mechanism, which may be configured to communicate over the S1G band.

In one example, devices 102 and/or 140 may be configured to perform the functionality of a NAN Device, which may support NAN operations in the S1G band.

In some demonstrative embodiments, the NAN device may be configured to support a NAN Channel in the S1G band.

In some demonstrative embodiments, the NAN Channel in the S1G band may be configured, for example, based on knowledge of the geographical location of the device, and/or based on applicable regulatory domain rules.

In some demonstrative embodiments, device 102 and/or device 140 may be configured to perform awareness networking communications over the S1G band, for example, via an S1G channel, e.g., a NAN Channel in the S1G band.

In some demonstrative embodiments, device 102 and/or device 140 may be configured to perform awareness networking using discovery scheme 200 (FIG. 2) according to values of the one or more parameters, which may be configured to communicate over the S1G band, e.g., as described below.

In some demonstrative embodiments, a device of device 102 and device 140, e.g., device 102, may determine a timing of a plurality of DWs according to a NAN Protocol.

In some demonstrative embodiments, controller 124 may determine the timing of the DWs according to the NAN Protocol, e.g., as described below.

In some demonstrative embodiments, radio 114 and/or radio 144 may communicate one or more NAN messages over the S1G band during one or more of the DWs, e.g., as described below.

In some demonstrative embodiments, the one or more NAN messages may be in compliance with an IEEE 802.11ah Specification.

In some demonstrative embodiments, controller 124 may determine the timing of the plurality of DWs, for example, based on one or more parameters of the S1G discovery scheme, e.g., as described below.

In some demonstrative embodiments, a DW duration of a DW of the plurality of DWs in the S1G discovery scheme may be longer than a DW duration defined for the 2.4/5 GHZ bands.

In one example, the DW duration of the DW of the plurality of DWs may be a multiple of the DW duration defined for the 2.4/5 GHZ bands.

In some demonstrative embodiments, the DW duration of a DW of the plurality of DWs may be n times 16 time units (TU).

In some demonstrative embodiments, n may be greater than 1.

In some demonstrative embodiments, n may be at least 4. In other embodiments, n may be at least 8. In other embodiments, n may be any other number.

In one example, n may be 4. According to this example, the DW duration of s DW of the plurality of DWs in the S1G discovery scheme may be 64 TUs. For example, DW duration 210 (FIG. 2) may be 64 TUs, e.g., if n is 4.

In some demonstrative embodiments, a DW interval between two consecutive DWs in the S1G discovery scheme may be longer than a DW interval defined for the 2.4/5 GHZ bands.

In one example, the DW interval between two consecutive DWs may be a multiple of the DW interval defined for the 2.4/5 GHZ bands.

In some demonstrative embodiments, the DW interval between two consecutive DWs may be m times 512 time units (TU), In some demonstrative embodiments, m may be greater than 1.

In some demonstrative embodiments, m may be at least 4. In other embodiments, m may be at least 8. In other embodiments, m may be any other number.

In one example, m may be 4. According to this example, the DW interval between two consecutive DWs of the S1G discovery scheme may be 2048 TUs. For example, DW interval 210 (FIG. 2) may be 2048 TUs, e.g., if m is 4.

In one example, the duration of 2048 TUs, may introduce, for example, a latency of 2 seconds (sec).

In some demonstrative embodiments, a time, for example, a time of 256 TU, may be defined to be a first Discovery Window Starting Time (DWST) in the Sub 1 GHz frequency band NAN channel.

In some demonstrative embodiments, controller 124 may be configured to cause device 102 to communicate a discovery beacon according to a discovery beacon interval, which may be longer than a discovery beacon interval defined for the 2.4/5 GHZ bands.

In some demonstrative embodiments, the discovery beacon interval in the S1G discovery scheme may be longer than a discovery beacon interval defined for the 2.4/5 GHZ bands.

In some demonstrative embodiments, the discovery beacon interval in the S1G discovery scheme may be a multiple of the discovery beacon interval defined for the 2.4/5 GHZ bands.

In some demonstrative embodiments, controller 124 may be configured to cause device 102 to communicate the discovery beacon according to a discovery beacon interval, which may be l times 100 time units (TU).

In some demonstrative embodiments, l may be greater than 1.

In some demonstrative embodiments, l may be at least 4. In other embodiments, l may be at least 8. In other embodiments, l may be any other number.

In some demonstrative embodiments, l may be equal to m.

In one example, l may be equal to m, and m may be equal to 8. According to this example, the discovery beacon interval of the S1G discovery scheme may be 800 TUs, and the DW interval of the S1G discovery scheme may be 4096 TUs. For example, DW interval 210 (FIG. 2) may be 4096 TUs and discovery beacon interval 212 (FIG. 2) may be 800 TUs, e.g., if m is 8.

In some demonstrative embodiments, a DW of the plurality of DWs in the S1G discovery scheme may be divided into two parts, portions, or segments.

In some demonstrative embodiments, the DW may be divided into the two segments, for example, to separate between communication of the sync beacons and communication of the service discovery frames.

In some demonstrative embodiments, a DW of the plurality of DWs may be divided into a first segment to communicate one or more synchronization beacons, and a second segment to communicate one or more service discovery frames.

In some demonstrative embodiments, the second segment may be longer than the first segment.

In some demonstrative embodiments, a duration of the second segment may be a multiple of a duration of the first segment.

In some demonstrative embodiments, the second segment may be at least two times longer than the first segment. In other embodiments, the second segment may be at least four times longer than the first segment.

In some demonstrative embodiments the second segment may be after the first segment.

In some demonstrative embodiments the first segment may be 16 TUs long.

In one example, n may be 4, m may be 8, and the first segment may be 16 TUs long. According to this example, the DW duration may be 64 TUs, the second segment may be 48 TUs, and the beacon interval may be 2048 TUs.

Reference is made to FIG. 3, which schematically illustrates a discovery window 300, in accordance with some demonstrative embodiments. For example, discovery windows 208 and/or 209 (FIG. 2) may be configured according to discovery window 300.

In some demonstrative embodiments, devices 102 and/or 140 (FIG. 1) may perform awareness networking over the S1G band according to the configuration of discovery window 300.

In some demonstrative embodiments, discovery window 300 may be divided into a segment 302 ("Segment 1"), and a segment 304 ("Segment 2"), e.g., as described below.

In some demonstrative embodiments, segment 302 may be configured for, and/or dedicated to, communication of one or more synchronization beacons. For example, device 102 (FIG. 1) may transmit one or more synchronization beacons 202 (FIG. 2) during segment 302.

In some demonstrative embodiments, a number of transmissions of synchronization beacons may be expected to be low, for example, when operating in a large area.

In some demonstrative embodiments, a duration of segment 302 may be set to be short, e.g., compared to a duration of segment 304.

In some demonstrative embodiments, the short duration of segment 302 may enable maintaining reduced power consumption of stations of an awareness network, e.g., device 140, for example, even if the stations are to wake up and stay awake during segment 302, for example, for each discovery window, e.g., to receive the synchronization beacons and maintain synchronization.

In one example, if segment 302 is set to be 16 TU long, and the DW interval is set to 2048 TUs, then a wake up time percentage, e.g., a percentage of the duration of segment 302 relative to a DW interval, may be 0.78%, e.g., $16/2048$.

In some demonstrative embodiments, segment 304 may be configured to, and/or dedicated to, communicate one or more service discovery frames, for example, service discovery frames 206 (FIG. 2).

In some demonstrative embodiments, the duration of segment 304 may be long, e.g., compared to the duration of segment 302, for example, to enable communication of service discovery frames by a large number of devices.

In one example, segment 314 may be 112 TUs long, for example, if segment 302 is set to be 16 TUs long, and the DW is 128 TU long.

In some demonstrative embodiments, dividing discovery window 300 into segments 302 and 304 may enable one or more devices, for example, device 140 (FIG. 1), to scan during segment 304, for example, to discover device 102 (FIG. 1).

Referring back to FIG. 1, in some demonstrative embodiments, the S1G discovery scheme may be configured to include one or more discovery windows each having the first and second segments, e.g., segments 302 and 304 (FIG. 3).

In some demonstrative embodiments, the S1G discovery scheme may be configured to include one or more first discovery windows, which include only the first segment, e.g., segment 302 (FIG. 3), and one or more second discovery windows which include both the first and second segments, e.g., segments 302 and 304 (FIG. 3).

In some demonstrative embodiments, controller 124 may be configured to cause device 102 to determine a timing of a first sequence of first DWs having a first DW duration to communicate synchronization beacons.

In some demonstrative embodiments, controller 124 may be configured to cause device 102 to determine a timing of a second sequence of second DWs having a second DW duration longer than the first DW duration.

In some demonstrative embodiments, a DW of the second DWs may be divided into a first segment to communicate synchronization beacons and a second segment to communicate service discovery frames. For example, a DW of the second DWs may include segments 302 and 304 (FIG. 3).

In some demonstrative embodiments, two consecutive second DWs may be separated by one or more first DWs.

In one example, two consecutive second DWs may be separated by 2 first DWs, and the DW interval may be 2048 TUs. According to this example, segment 304 of the second DWs may occur once in 6144 TUs.

In one example, an S1G sensor, e.g., a meter device and/or a sensor device, which wakes up once every minute, hour, and/or day to discover other devices and/or to collect data, may minimize a scan time, for example to discover the other devices and/or to collect the data, for example, if the S1G sensor is to discover the other devices and/or to collect the data every segment 304.

According to this example, power consumption of the S1G device may be reduced, e.g., minimized, for example, by reducing the scan time.

Figure 4:
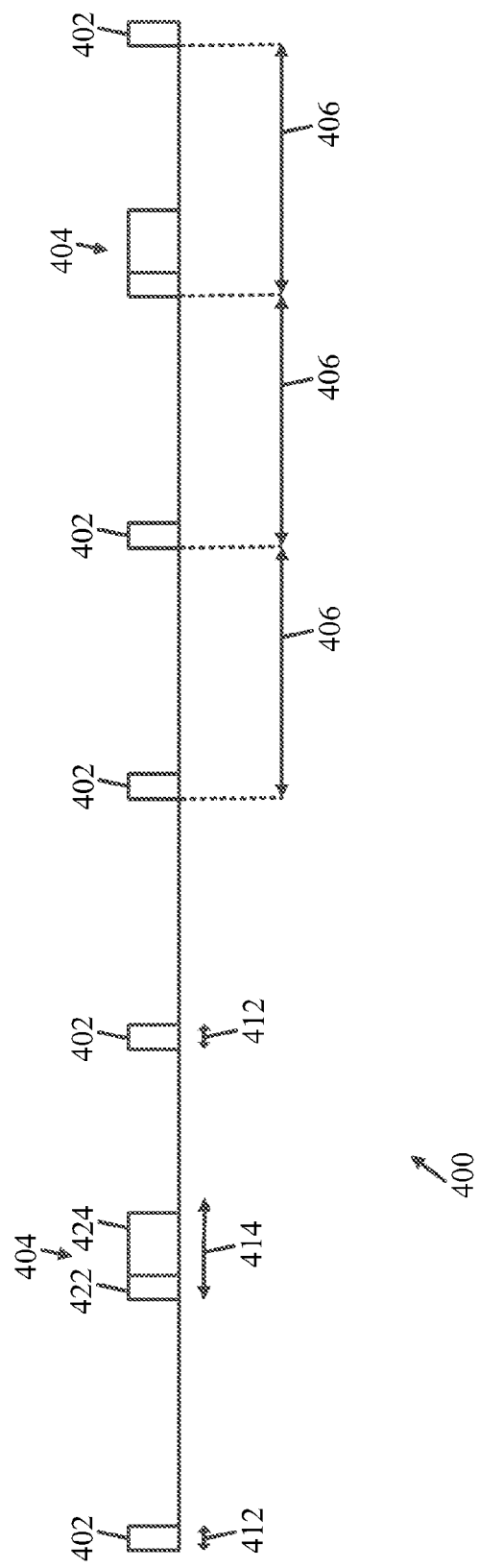
FIG. 4 is a schematic illustration of a discovery scheme, in accordance with some demonstrative embodiments.

Reference is made to FIG. 4, which schematically illustrates a discovery scheme 400, in accordance with some demonstrative embodiments. For example, devices 102 and/or 140 (FIG. 1) may communicate over the S1G band according to discovery scheme 400.

In some demonstrative embodiments, discovery scheme 400 may be configured for NAN communication over the S1G band.

In some demonstrative embodiments, devices 102 and/or 140 (FIG. 1) may use discovery scheme 400 for NAN communication over the S1G band.

As shown in FIG. 4, discovery scheme 400 may include a first sequence of first DWs 402, having a first DW duration 412.

As shown in FIG. 4, discovery scheme 400 may include a second sequence of second DWs 404, having a second DW duration 414.

As shown in FIG. 4, DW duration 414 may be longer than DW duration 412.

In some demonstrative embodiments, a DW 402 may be configured to communicate synchronization beacons, and a DW 404 may be configured to communicate synchronization beacons and service discovery frames.

In some demonstrative embodiments, the DW 404 may include a first segment 422 to communicate the synchronization beacons, and a second segment 424 to communicate the service discovery frames.

In one example, first segment 422 and/or DW 402 may include first segment 302 (FIG. 3), and/or second segment 424 may include second segment 304 (FIG. 3).

As shown in FIG. 4, two consecutive DWs 202 may be separated by one or more DWs 402, e.g., 3 DWs 402.

In one example, a DW interval 406 of discovery scheme 400 may be 2048 TUs, DW duration 412 may be 16 TUS, and/or DW duration 414 may be 64 TUs. According to this example, the second segment may be 48 TUs, e.g., 64 TUs-16 TUs, and a scan time percentage, e.g., a time percentage configured to discover and/or to scan for other devices, may be 0.58%, e.g., $^{48}/_{2048}*4$.

In some demonstrative embodiments, using discovery scheme 400, which includes segment 424 in only part of the DWs, may be useful, for example, for devices, e.g., meter devices and/or sensors, and the like, which only wake up once every minute, hours, or days, to discover devices and/or collect data, and may enable the devices to minimize power consumption.

In some demonstrative embodiments, using discovery scheme 400 may be useful, for example, for devices operating over the S1G band, e.g., devices operating according to an IEEE 802.11ah Standard.

Refereeing back to FIG. 1, using an S1G discovery scheme, e.g., discovery scheme 200 (FIG. 2) and/or discovery scheme 400 (FIG. 4), may enable NAN communication over the S1G band, e.g., as described above.

In some demonstrative embodiments, using the S1G discovery scheme may enable to reduce power consumption of one or more S1G devices, for example, sensors, and/or meter devices having limited power supply, e.g., as described above.

Figure 5:
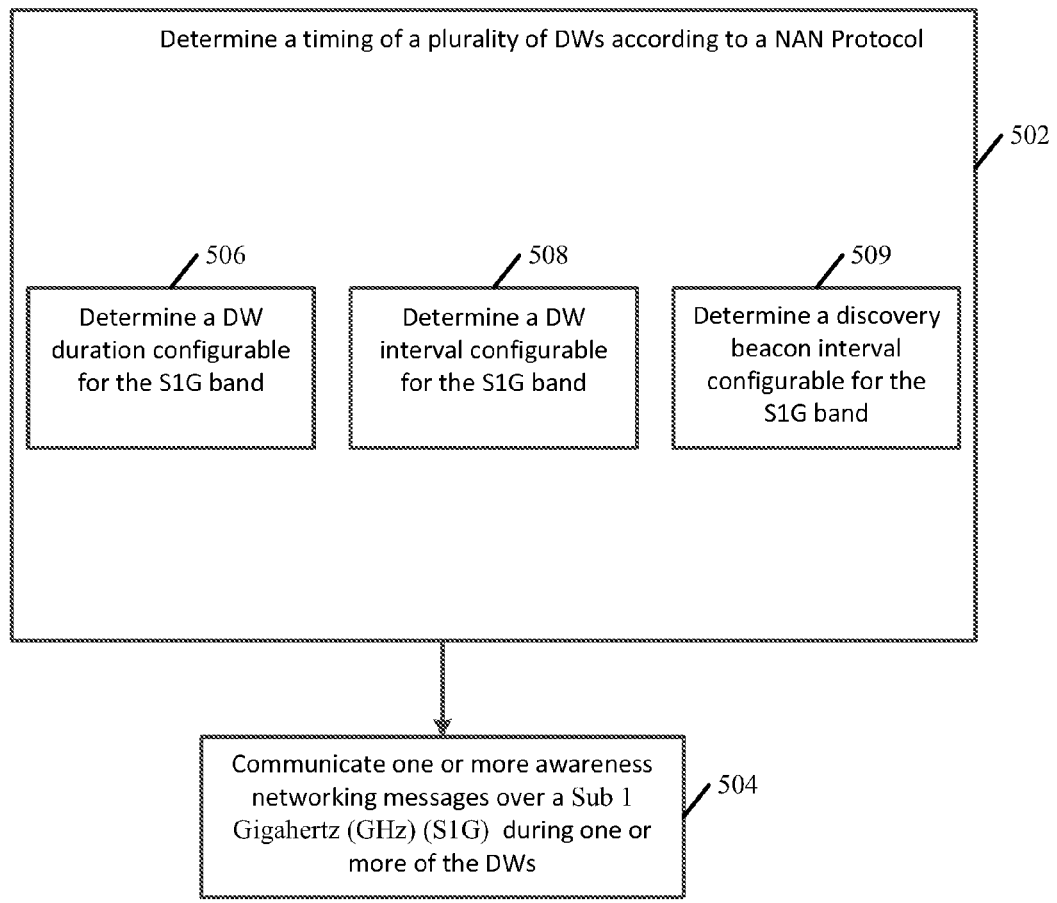
FIG. 5 is a schematic flow-chart illustration of a method of awareness networking communications over a Sub 1 Gigahertz Band, in accordance with some demonstrative embodiments.

Reference is made to FIG. 5, which schematically illustrates a method of awareness networking communications over a Sub 1 Gigahertz Band, in accordance with some demonstrative embodiments. For example, one or more of the operations of the method of FIG. 5 may be performed by a wireless communication system, e.g., system 100 (FIG. 1); a wireless device, e.g., wireless devices 102 and/or 140 (FIG. 1); a radio, e.g., radios 114 and/or 154 (FIG. 1); a controller, e.g., controllers 124 and/or 154 (FIG. 1); and/or a message processor, e.g., message processors 128 and/or 158 (FIG. 1).

As indicated at block 502, the method may include determining a timing of a plurality of DWs according to a NAN Protocol. For example, devices 102 and/or 140 (FIG. 1) may determine the timing of the plurality of DWs according to the NAN Protocol, e.g., as described above.

As indicated at block 504, the method may include communicating one or more awareness networking messages over the S1G band during one or more of the DWs. For example, devices 102 and/or 140 (FIG. 1) may communicate the one or more awareness networking messages over the S1G band during the one or more of the DWs, e.g., as described above.

As indicated at block 506, determining the timing may include determining a DW duration configurable for the S1G band. For example, DW duration 214 (FIG. 2) may be longer than a DW duration defined for a 2.4/5 GHz, e.g., as described above.

As indicated at block 508, determining the timing may include determining a DW interval configurable for the S1G band. For example, DW interval 210 (FIG. 2) may be longer than a DW interval defined for a 2.4/5 GHz, e.g., as described above.

As indicated at block 510, determining the timing may include determining a discovery beacon interval configurable for the S1G band. For example, discovery beacon interval 212 (FIG. 2) may be longer than discovery beacon interval defined for a 2.4/5 GHz, e.g., as described above.

Figure 6:
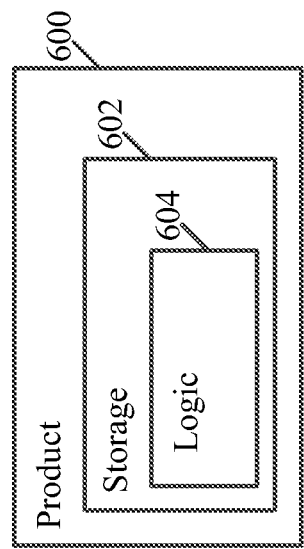
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102 (FIG. 1) and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more of the operations described above with respect to FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to determine a timing of a plurality of Discovery Windows (DWs) according to a Neighbor Awareness Networking (NAN) Protocol; and communicate one or more NAN messages over a Sub 1 Gigahertz (GHz) (S1G) band during one or more of the DWs.

Example 2 includes the subject matter of Example 1, and optionally, wherein a DW duration of a DW of the plurality of DWs is longer than a DW duration defined for a 2.4 Gigahertz (GHz) or 5 GHz band.

Example 3 includes the subject matter of Example 1 or 2, and optionally, wherein a DW duration of a DW of the plurality of DWs is n times 16 time units (TU), wherein n is greater than 1.

Example 4 includes the subject matter of Example 3, and optionally, wherein n is at least 4.

Example 5 includes the subject matter of any one of Examples 1-4, and optionally, wherein a DW of the plurality of DWs is divided into a first segment to communicate one or more synchronization beacons, and a second segment to communicate one or more service discovery frames.

Example 6 includes the subject matter of Example 5, and optionally, wherein the second segment is longer than the first segment.

Example 7 includes the subject matter of Example 5 or 6, and optionally, wherein the second segment is at least two times longer than the first segment.

Example 8 includes the subject matter of any one of Examples 5-7, and optionally, wherein the second segment is after the first segment.

Example 9 includes the subject matter of any one of Examples 5-8, and optionally, wherein the first segment is 16 time units (TU) long.

Example 10 includes the subject matter of Example 1, and optionally, wherein the apparatus is to cause the wireless station to determine a timing of a first sequence of first DWs having a first DW duration to communicate synchronization beacons, and a second sequence of second DWs having a second DW duration longer than the first DW duration, a DW of the second DWs being divided into a first segment to communicate synchronization beacons and a second segment to communicate service discovery frames, wherein two consecutive second DWs are separated by one or more first DWs.

Example 11 includes the subject matter of any one of Examples 1-10, and optionally, wherein a DW interval between two consecutive DWs is longer than a DW interval defined for a 2.4 Gigahertz (GHz) or 5 GHz band.

Example 12 includes the subject matter of any one of Examples 1-10, and optionally, wherein a DW interval between two consecutive DWs is m times 512 time units (TU), wherein m is greater than 1.

Example 13 includes the subject matter of Example 12, and optionally, wherein m is at least 4.

Example 14 includes the subject matter of any one of Examples 1-13, and optionally, wherein the apparatus is to cause the wireless station to communicate a discovery beacon according to a discovery beacon interval, which is longer than a discovery beacon interval defined for a 2.4 Gigahertz (GHz) or 5 GHz band.

Example 15 includes the subject matter of any one of Examples 1-14, and optionally, wherein the apparatus is to cause the wireless station to communicate a discovery beacon according to a discovery beacon interval, which is l times 100 time units (TU), wherein l is greater than 1.

Example 16 includes the subject matter of Example 15, and optionally, wherein a DW interval between two consecutive DWs is m times 512 TU, and wherein l is equal to m.

Example 17 includes the subject matter of Example 15 or 16, and optionally, wherein l is at least 4.

Example 18 includes the subject matter of any one of Examples 1-17, and optionally, wherein the one or more awareness networking messages are in compliance with an IEEE 802.11ah Specification.

Example 19 includes the subject matter of any one of Examples 1-18, and optionally, comprising a transmitter to transmit the awareness networking messages.

Example 20 includes the subject matter of any one of Examples 1-19, and optionally, comprising one or more antennas, a memory, and a processor.

Example 21 includes a system comprising a wireless device, the wireless device comprising one or more antennas; a memory; a processor; a controller to determine a timing of a plurality of Discovery Windows (DWs) according to a Neighbor Awareness Networking (NAN) Protocol; and a radio to communicate one or more awareness networking messages over a Sub 1 Gigahertz (GHz) (S1G) band during one or more of the DWs.

Example 22 includes the subject matter of Example 21, and optionally, wherein a DW duration of a DW of the plurality of DWs is longer than a DW duration defined for a 2.4 Gigahertz (GHz) or 5 GHz band.

Example 23 includes the subject matter of Example 21 or 22, and optionally, wherein a DW duration of a DW of the plurality of DWs is n times 16 time units (TU), wherein n is greater than 1.

Example 24 includes the subject matter of Example 23, and optionally, wherein n is at least 4.

Example 25 includes the subject matter of any one of Examples 21-24, and optionally, wherein a DW of the plurality of DWs is divided into a first segment to communicate one or more synchronization beacons, and a second segment to communicate one or more service discovery frames.

Example 26 includes the subject matter of Example 25, and optionally, wherein the second segment is longer than the first segment.

Example 27 includes the subject matter of Example 25 or 26, and optionally, wherein the second segment is at least two times longer than the first segment.

Example 28 includes the subject matter of any one of Examples 25-27, and optionally, wherein the second segment is after the first segment.

Example 29 includes the subject matter of any one of Examples 25-28, and optionally, wherein the first segment is 16 time units (TU) long.

Example 30 includes the subject matter of Example 21, and optionally, wherein the wireless device is to determine a timing of a first sequence of first DWs having a first DW duration to communicate synchronization beacons, and a second sequence of second DWs having a second DW duration longer than the first DW duration, a DW of the second DWs being divided into a first segment to communicate synchronization beacons and a second segment to communicate service discovery frames, wherein two consecutive second DWs are separated by one or more first DWs.

Example 31 includes the subject matter of any one of Examples 21-30, and optionally, wherein a DW interval between two consecutive DWs is longer than a DW interval defined for a 2.4 Gigahertz (GHz) or 5 GHz band.

Example 32 includes the subject matter of any one of Examples 21-30, and optionally, wherein a DW interval between two consecutive DWs is m times 512 time units (TU), wherein m is greater than 1.

Example 33 includes the subject matter of Example 32, and optionally, wherein m is at least 4.

Example 34 includes the subject matter of any one of Examples 21-33, and optionally, wherein the wireless device is to communicate a discovery beacon according to a discovery beacon interval, which is longer than a discovery beacon interval defined for a 2.4 Gigahertz (GHz) or 5 GHz band.

Example 35 includes the subject matter of any one of Examples 21-34, and optionally, wherein the wireless device is to communicate a discovery beacon according to a discovery beacon interval, which is l times 100 time units (TU), wherein l is greater than 1.

Example 36 includes the subject matter of Example 35, and optionally, wherein a DW interval between two consecutive DWs is m times 512 TU, and wherein l is equal to m.

Example 37 includes the subject matter of Example 35 or 36, and optionally, wherein l is at least 4.

Example 38 includes the subject matter of any one of Examples 21-37, and optionally, wherein the one or more awareness networking messages are in compliance with an IEEE 802.11ah Specification.

Example 39 includes a method to be performed at a wireless device, the method comprising determining a timing of a plurality of Discovery Windows (DWs) according to a Neighbor Awareness Networking (NAN) Protocol; and communicating one or more awareness networking messages over a Sub 1 Gigahertz (GHz) (S1G) band during one or more of the DWs.

Example 40 includes the subject matter of Example 39, and optionally, wherein a DW duration of a DW of the plurality of DWs is longer than a DW duration defined for a 2.4 Gigahertz (GHz) or 5 GHz band.

Example 41 includes the subject matter of Example 39 or 40, and optionally, wherein a DW duration of a DW of the plurality of DWs is n times 16 time units (TU), wherein n is greater than 1.

Example 42 includes the subject matter of Example 41, and optionally, wherein n is at least 4.

Example 43 includes the subject matter of any one of Examples 39-42, and optionally, wherein a DW of the plurality of DWs is divided into a first segment to communicate one or more synchronization beacons, and a second segment to communicate one or more service discovery frames.

Example 44 includes the subject matter of Example 43, and optionally, wherein the second segment is longer than the first segment.

Example 45 includes the subject matter of Example 43 or 44, and optionally, wherein the second segment is at least two times longer than the first segment.

Example 46 includes the subject matter of any one of Examples 43-45, and optionally, wherein the second segment is after the first segment.

Example 47 includes the subject matter of any one of Examples 43-46, and optionally, wherein the first segment is 16 time units (TU) long.

Example 48 includes the subject matter of Example 39, and optionally, comprising determining a timing of a first sequence of first DWs having a first DW duration to communicate synchronization beacons, and a second sequence of second DWs having a second DW duration longer than the first DW duration, a DW of the second DWs being divided into a first segment to communicate synchronization beacons and a second segment to communicate service discovery frames, wherein two consecutive second DWs are separated by one or more first DWs.

Example 49 includes the subject matter of any one of Examples 39-48, and optionally, wherein a DW interval between two consecutive DWs is longer than a DW interval defined for a 2.4 Gigahertz (GHz) or 5 GHz band.

Example 50 includes the subject matter of any one of Examples 39-48, and optionally, wherein a DW interval between two consecutive DWs is m times 512 time units (TU), wherein m is greater than 1.

Example 51 includes the subject matter of Example 50, and optionally, wherein m is at least 4.

Example 52 includes the subject matter of any one of Examples 39-51, and optionally, comprising communicating a discovery beacon according to a discovery beacon interval, which is longer than a discovery beacon interval defined for a 2.4 Gigahertz (GHz) or 5 GHz band.

Example 53 includes the subject matter of any one of Examples 39-52, and optionally, comprising communicating a discovery beacon according to a discovery beacon interval, which is l times 100 time units (TU), wherein l is greater than 1.

Example 54 includes the subject matter of Example 53, and optionally, wherein a DW interval between two consecutive DWs is m times 512 TU, and wherein l is equal to m.

Example 55 includes the subject matter of Example 53 or 54, and optionally, wherein l is at least 4.

Example 56 includes the subject matter of any one of Examples 39-55, and optionally, wherein the one or more awareness networking messages are in compliance with an IEEE 802.11ah Specification.

Example 57 includes a product including one or more tangible computer-readable non-transitory storage media comprising computer-executable instructions operable to, when executed by at least one computer processor, enable the at least one computer processor to implement a method at a wireless device, the method comprising determining a timing of a plurality of Discovery Windows (DWs) according to a Neighbor Awareness Networking (NAN) Protocol; and communicating one or more awareness networking messages over a Sub 1 Gigahertz (GHz) (S1G) band during one or more of the DWs.

Example 58 includes the subject matter of Example 57, and optionally, wherein a DW duration of a DW of the plurality of DWs is longer than a DW duration defined for a 2.4 Gigahertz (GHz) or 5 GHz band.

Example 59 includes the subject matter of Example 57 or 58, and optionally, wherein a DW duration of a DW of the plurality of DWs is n times 16 time units (TU), wherein n is greater than 1.

Example 60 includes the subject matter of Example 59, and optionally, wherein n is at least 4.

Example 61 includes the subject matter of any one of Examples 57-60, and optionally, wherein a DW of the plurality of DWs is divided into a first segment to communicate one or more synchronization beacons, and a second segment to communicate one or more service discovery frames.

Example 62 includes the subject matter of Example 61, and optionally, wherein the second segment is longer than the first segment.

Example 63 includes the subject matter of Example 61 or 62, and optionally, wherein the second segment is at least two times longer than the first segment.

Example 64 includes the subject matter of any one of Examples 61-63, and optionally, wherein the second segment is after the first segment.

Example 65 includes the subject matter of any one of Examples 61-64, and optionally, wherein the first segment is 16 time units (TU) long.

Example 66 includes the subject matter of Example 57, and optionally, wherein the method comprises determining a timing of a first sequence of first DWs having a first DW duration to communicate synchronization beacons, and a second sequence of second DWs having a second DW duration longer than the first DW duration, a DW of the second DWs being divided into a first segment to communicate synchronization beacons and a second segment to communicate service discovery frames, wherein two consecutive second DWs are separated by one or more first DWs.

Example 67 includes the subject matter of any one of Examples 57-66, and optionally, wherein a DW interval between two consecutive DWs is longer than a DW interval defined for a 2.4 Gigahertz (GHz) or 5 GHz band.

Example 68 includes the subject matter of any one of Examples 57-66, and optionally, wherein a DW interval between two consecutive DWs is m times 512 time units (TU), wherein m is greater than 1.

Example 69 includes the subject matter of Example 68, and optionally, wherein m is at least 4.

Example 70 includes the subject matter of any one of Examples 57-69, and optionally, wherein the method comprises communicating a discovery beacon according to a discovery beacon interval, which is longer than a discovery beacon interval defined for a 2.4 Gigahertz (GHz) or 5 GHz band.

Example 71 includes the subject matter of any one of Examples 57-70, and optionally, wherein the method comprises communicating a discovery beacon according to a discovery beacon interval, which is l times 100 time units (TU), wherein l is greater than 1.

Example 72 includes the subject matter of Example 71, and optionally, wherein a DW interval between two consecutive DWs is m times 512 TU, and wherein l is equal to m.

Example 73 includes the subject matter of Example 71 or 72, and optionally, wherein l is at least 4.

Example 74 includes the subject matter of any one of Examples 57-73, and optionally, wherein the one or more awareness networking messages are in compliance with an IEEE 802.11ah Specification.

Example 75 includes an apparatus of wireless communication, the apparatus comprising means for determining at a wireless device a timing of a plurality of Discovery Windows (DWs) according to a Neighbor Awareness Networking (NAN) Protocol; and means for communicating one or more awareness networking messages over a Sub 1 Gigahertz (GHz) (S1G) band during one or more of the DWs.

Example 76 includes the subject matter of Example 75, and optionally, wherein a DW duration of a DW of the plurality of DWs is longer than a DW duration defined for a 2.4 Gigahertz (GHz) or 5 GHz band.

Example 77 includes the subject matter of Example 75 or 76, and optionally, wherein a DW duration of a DW of the plurality of DWs is n times 16 time units (TU), wherein n is greater than 1.

Example 78 includes the subject matter of Example 77, and optionally, wherein n is at least 4.

Example 79 includes the subject matter of any one of Examples 75-78, and optionally, wherein a DW of the plurality of DWs is divided into a first segment to communicate one or more synchronization beacons, and a second segment to communicate one or more service discovery frames.

Example 80 includes the subject matter of Example 79, and optionally, wherein the second segment is longer than the first segment.

Example 81 includes the subject matter of Example 79 or 80, and optionally, wherein the second segment is at least two times longer than the first segment.

Example 82 includes the subject matter of any one of Examples 79-81, and optionally, wherein the second segment is after the first segment.

Example 83 includes the subject matter of any one of Examples 79-82, and optionally, wherein the first segment is 16 time units (TU) long.

Example 84 includes the subject matter of Example 75, and optionally, comprising means for determining a timing of a first sequence of first DWs having a first DW duration to communicate synchronization beacons, and a second sequence of second DWs having a second DW duration longer than the first DW duration, a DW of the second DWs being divided into a first segment to communicate synchronization beacons and a second segment to communicate service discovery frames, wherein two consecutive second DWs are separated by one or more first DWs.

Example 85 includes the subject matter of any one of Examples 75-84, and optionally, wherein a DW interval between two consecutive DWs is longer than a DW interval defined for a 2.4 Gigahertz (GHz) or 5 GHz band.

Example 86 includes the subject matter of any one of Examples 75-84, and optionally, wherein a DW interval between two consecutive DWs is m times 512 time units (TU), wherein m is greater than 1.

Example 87 includes the subject matter of Example 86, and optionally, wherein m is at least 4.

Example 88 includes the subject matter of any one of Examples 75-87, and optionally, comprising means for communicating a discovery beacon according to a discovery beacon interval, which is longer than a discovery beacon interval defined for a 2.4 Gigahertz (GHz) or 5 GHz band.

Example 89 includes the subject matter of any one of Examples 75-88 comprising means for communicating a discovery beacon according to a discovery beacon interval, which is l times 100 time units (TU), wherein l is greater than 1.

Example 90 includes the subject matter of Example 89, and optionally, wherein a DW interval between two consecutive DWs is m times 512 TU, and wherein l is equal to m.

Example 91 includes the subject matter of Example 89 or 90, and optionally, wherein l is at least 4.

Example 92 includes the subject matter of any one of Examples 75-91, and optionally, wherein the one or more awareness networking messages are in compliance with an IEEE 802.11ah Specification.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising:
a memory; and
a processor configured to cause a wireless station to:
determine a timing of a plurality of Discovery Windows (DWs) according to a Neighbor Awareness Networking (NAN) Protocol, a DW duration of a DW of said plurality of DWs is n times 16 Time Units (TU), n is greater than 1, and a DW interval between two consecutive DWs is m times 512 TU, m is greater than 1; and
communicate one or more NAN messages over a Sub 1 Gigahertz (GHz) (S1G) band during one or more of the DWs, the S1G band is below 1 GHz.
2. The apparatus of claim 1, wherein the DW duration of the DW of said plurality of DWs is longer than a DW duration defined for a 2.4 Gigahertz (GHz) or 5 GHz band.
3. The apparatus of claim 1, wherein n is at least 4.
4. The apparatus of claim 1, wherein the DW of said plurality of DWs is divided into a first segment to communicate one or more synchronization beacons, and a second segment to communicate one or more service discovery frames.
5. The apparatus of claim 4, wherein the second segment is longer than the first segment.
6. The apparatus of claim 4, wherein the second segment is at least two times longer than the first segment.
7. The apparatus of claim 4, wherein the second segment is after said first segment.
8. The apparatus of claim 4, wherein the first segment is 16 TUs long.
9. The apparatus of claim 1 configured to cause the wireless station to determine a timing of a first sequence of first DWs having a first DW duration to communicate synchronization beacons, and a second sequence of second DWs having a second DW duration longer than the first DW duration, a DW of the second DWs divided into a first segment to communicate synchronization beacons and a second segment to communicate service discovery frames, wherein two consecutive second DWs are separated by one or more first DWs.
10. The apparatus of claim 1, wherein the DW interval between the two consecutive DWs is longer than a DW interval defined for a 2.4 Gigahertz (GHz) or 5 GHz band.
11. The apparatus of claim 1 configured to cause the wireless station to communicate a discovery beacon according to a discovery beacon interval, which is l times 100 TUs, wherein l is greater than 1.
12. The apparatus of claim 11, wherein l is equal to m.
13. The apparatus of claim 1, wherein the one or more NAN messages are in compliance with an IEEE 802.11ah Specification.
14. The apparatus of claim 1 comprising one or more antennas.
15. A system comprising a wireless device, the wireless device comprising:
one or more antennas;
a memory;
a processor;
a controller to determine a timing of a plurality of Discovery Windows (DWs) according to a Neighbor Awareness Networking (NAN) Protocol, a DW duration of a DW of said plurality of DWs is n times 16 Time Units (TU), n is greater than 1, and a DW interval between two consecutive DWs is in times 512 TU, m is greater than 1; and
a radio to communicate one or more NAN messages over a Sub 1 Gigahertz (GHz) (S1G) band during one or more of the DWs, the S1G band is below 1 GHz.
16. The system of claim 15, wherein the DW of said plurality of DWs is divided into a first segment to communicate one or more synchronization beacons, and a second segment to communicate one or more service discovery frames.
17. The system of claim 16, wherein the second segment is longer than the first segment.
18. The system of claim 15, wherein n is at least 4.
19. The system of claim 15, wherein the wireless device is to determine a timing of a first sequence of first DWs having a first DW duration to communicate synchronization beacons, and a second sequence of second DWs having a second DW duration longer than the first DW duration, a DW of the second DWs divided into a first segment to communicate synchronization beacons and a second segment to communicate service discovery frames, wherein two consecutive second DWs are separated by one or more first DWs.
20. A method to be performed at a wireless device, the method comprising:
determining a timing of a plurality of Discovery Windows (DWs) according to a Neighbor Awareness Networking (NAN) Protocol, a DW duration of a DW of said plurality of DWs is n times 16 Time Units (TU), n is greater than 1, and a DW interval between two consecutive DWs is m times 512 TU, m is greater than 1; and
communicating one or more NAN messages over a Sub 1 Gigahertz (GHz) (S1G) band during one or more of the DWs, the S1G band is below 1 GHz.
21. The method of claim 20, wherein the DW of said plurality of DWs is divided into a first segment to communicate one or more synchronization beacons, and a second segment to communicate one or more service discovery frames.
22. A product including one or more tangible computer-readable non-transitory storage media comprising computer-executable instructions operable to, when executed by at least one processor, enable the at least one processor to cause a wireless device to:
determine a timing of a plurality of Discovery Windows (DWs) according to a Neighbor Awareness Networking (NAN) Protocol, a DW duration of a DW of said plurality of DWs is n times 16 Time Units (TU), n is greater than 1, and a DW interval between two consecutive DWs is in times 512 TU, m is greater than 1; and
communicate one or more NAN messages over a Sub 1 Gigahertz (GHz) (S1G) band during one or more of the DWs, the S1G band is below 1 GHz.
23. The product of claim 22, wherein the DW of said plurality of DWs is divided into a first segment to communicate one or more synchronization beacons, and a second segment to communicate one or more service discovery frames.
24. The product of claim 23, wherein the second segment is longer than the first segment.
25. The product of claim 22, wherein the instructions, when executed, cause the wireless device to determine a timing of a first sequence of first DWs having a first DW duration to communicate synchronization beacons, and a second sequence of second DWs having a second DW duration longer than the first DW duration, a DW of the second DWs divided into a first segment to communicate synchronization beacons and a second segment to communicate service discovery frames, wherein two consecutive second DWs are separated by one or more first DWs.

* * * * *

UNITED STATES PATENT AND TRADEMARK OFFICE
CERTIFICATE OF CORRECTION

PATENT NO. : 10,028,124 B2
APPLICATION NO. : 14/670599
DATED : July 17, 2018
INVENTOR(S) : Emily H. Qi et al.

Page 1 of 1

It is certified that error appears in the above-identified patent and that said Letters Patent is hereby corrected as shown below:

In the Claims

Column 26, Line 2, Claim 15, delete "is in times" and insert --is m times--, therefor.

Column 26, Line 52, Claim 22, delete "is in times" and insert --is m times--, therefor.

Signed and Sealed this
Twenty-eighth Day of August, 2018

Andrei Iancu
*Director of the United States Patent and Trademark Office*